United States Patent

Randriamasy et al.

(10) Patent No.: US 9,854,492 B2
(45) Date of Patent: Dec. 26, 2017

(54) HANDOVER ENHANCEMENT FOR USER EQUIPMENT APPLICATION LAYER TRAFFIC CARRIED OVER A MOBILE NETWORK

(71) Applicant: Alcatel Lucent, Boulogne, Billancourt (FR)

(72) Inventors: Claire-Sabine Randriamasy, Nozay (FR); Telemaco Melia, Rolle (CH); Bessem Sayadi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/390,615

(22) PCT Filed: Mar. 29, 2013

(86) PCT No.: PCT/EP2013/056837
§ 371 (c)(1),
(2) Date: Oct. 3, 2014

(87) PCT Pub. No.: WO2013/149972
PCT Pub. Date: Oct. 10, 2013

(65) Prior Publication Data
US 2015/0172983 A1 Jun. 18, 2015

(30) Foreign Application Priority Data

Apr. 3, 2012 (EP) .................... 12305398

(51) Int. Cl.
H04W 36/16 (2009.01)
H04W 36/00 (2009.01)
H04W 40/36 (2009.01)
H04W 48/00 (2009.01)

(52) U.S. Cl.
CPC ...... *H04W 36/165* (2013.01); *H04W 36/0011* (2013.01); *H04W 40/36* (2013.01); *H04W 48/17* (2013.01)

(58) Field of Classification Search
CPC .................................................. H04W 36/165
See application file for complete search history.

(56) References Cited

U.S. PATENT DOCUMENTS

2008/0026756 A1\* 1/2008 Harris ................... H04W 36/02
455/436
2009/0270102 A1\* 10/2009 Liu ....................... H04W 36/36
455/436
2011/0255512 A1 10/2011 Lee et al.

FOREIGN PATENT DOCUMENTS

| CN | 101772981 A | 7/2010 |
|---|---|---|
| EP | 0903906 A | 3/1999 |
| JP | H11-163947 A | 6/1999 |

(Continued)

OTHER PUBLICATIONS

International Search Report for PCT/EP2013/056837 dated May 28, 2013.

*Primary Examiner* — Chi H Pham
*Assistant Examiner* — Raul Rivas
(74) *Attorney, Agent, or Firm* — Fay Sharpe, LLP

(57) ABSTRACT

In an embodiment, there is provided a method for handover enhancement for User Equipment UE application layer traffic carried over a mobile network, said method comprising at least one step based on informing said UE of a traffic path change in said mobile network due to said handover, requiring action at application layer level.

12 Claims, 2 Drawing Sheets

(56) References Cited

FOREIGN PATENT DOCUMENTS

| | | |
|---|---|---|
| JP | 2005-532706 A | 10/2005 |
| JP | 2010-198317 A | 9/2010 |
| KR | 10-2010-0032904 | 3/2010 |
| KR | 10-2010-0032904 A | 3/2010 |
| KR | 10-2010-0073956 | 7/2010 |
| WO | WO 03/037030 A2 | 5/2003 |
| WO | 2011/098249 A | 8/2011 |

* cited by examiner

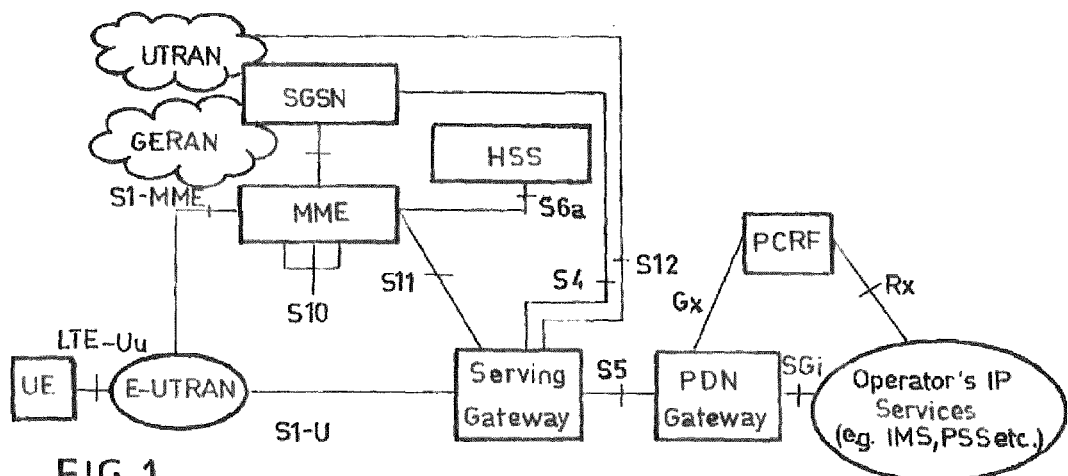
FIG_1
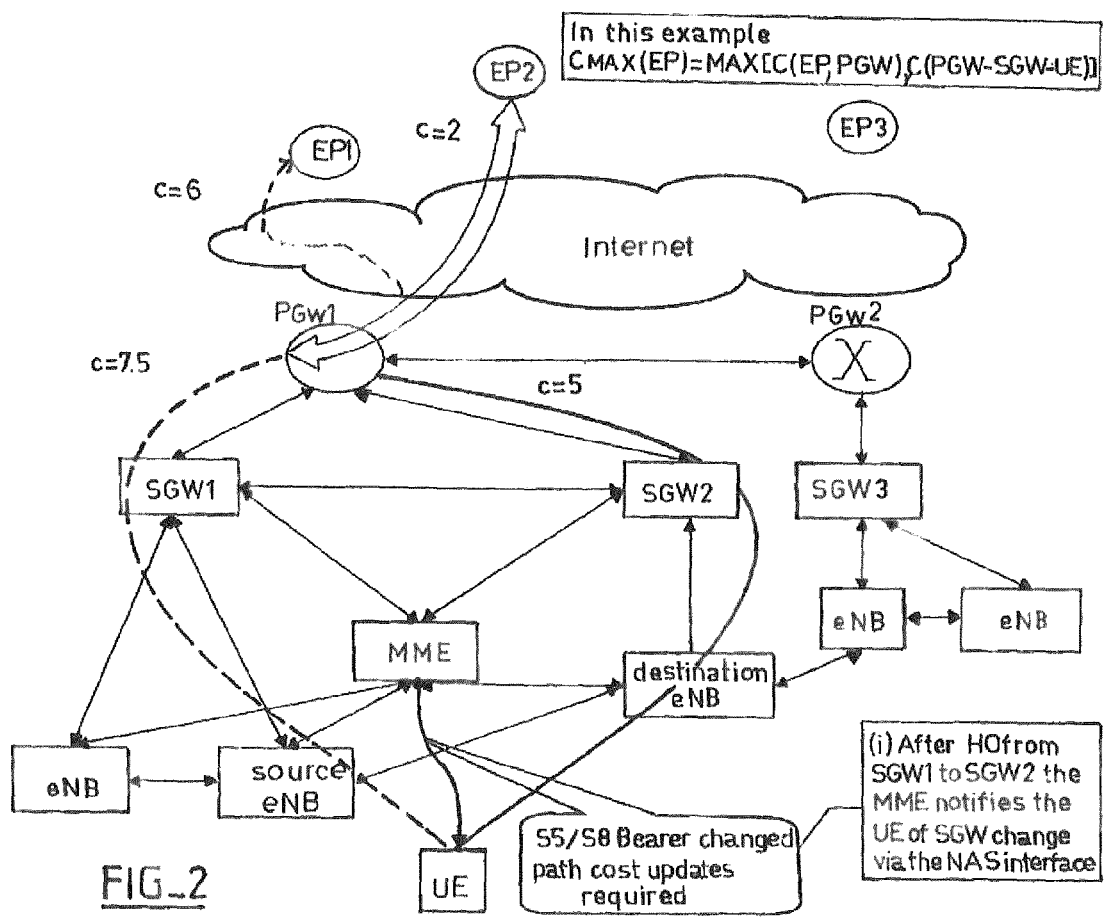
FIG_2

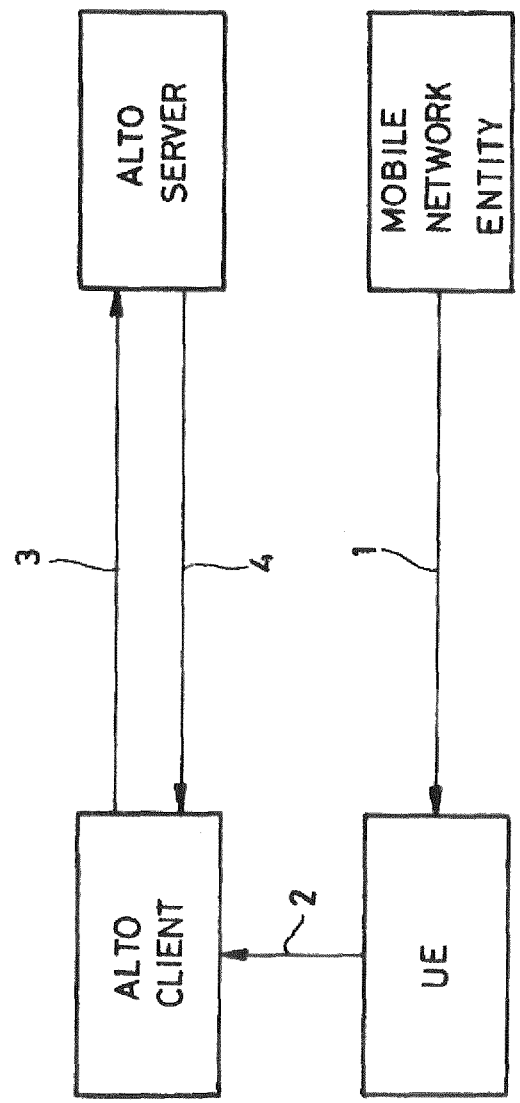
FIG_3

HANDOVER ENHANCEMENT FOR USER EQUIPMENT APPLICATION LAYER TRAFFIC CARRIED OVER A MOBILE NETWORK

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

An example of mobile system is Evolved Packet System (EPS), specified in particular in 3GPP TS 23.401. An example of architecture for EPS is recalled in FIG. 1, taken from 3GPP TS 23.401. An User Equipment UE has access to an EPS network including Evolved Packet Core (EPC) that can be accessed by E-UTRAN Radio Access Network. E-UTRAN includes network entities such as eNodeB (eNB). EPC includes network entities such as Mobility Management Entity (MME) interfacing with E-UTRAN in the control plane, Serving Gateway (SGW) interfacing with E-UTRAN in the user plane, and PDN Gateway (PGW) interfacing with Packet Data Network (PDN) such as an IP network, such as the Internet. Handover procedures, including intra E-UTRAN handover procedures, are specified in particular in 3GPP TS 23.401.

Application layer traffic related to various applications can thus be carried over a mobile network such as EPS network, between an UE and a connection endpoint in an external network.

Some applications, such as for example peer-to-peer (P2P) and content delivery, allow a choice in connection endpoints. Services such as for example the Application Layer Traffic Optimization (ALTO) service can then be used for connection endpoint selection, in order to increase locality of traffic, improve user-experience, amongst others. More detail on ALTO service and protocol can be found for example in ALTO protocol, draft-ietf-alto-protocol-11.txt, March 2012.

As recognized by the inventors and as will be explained with more detail later, there is a need for handover enhancements for UE application layer traffic carried over a mobile network.

Embodiments of the present invention in particular address such needs.

These and other objects are achieved, in one aspect, by a method for handover enhancement for User Equipment UE application layer traffic carried over a mobile network, said method comprising at least one step based on informing said UE of a traffic path change in said mobile network due to said handover, requiring action at application layer level.

These and other objects are achieved, in other aspects, by different entities for performing such method. Such entities may include, in particular, User Equipment UE, application layer-level entity associated with said UE and which may be included in said UE, such as ALTO Client, and mobile network entity such as entity involved in handover, such as Mobility Management Entity (MME) in EPS network.

Some embodiments of apparatus and/or methods in accordance with embodiments of the present invention are now described, by way of example only, and with reference to the accompanying drawings, in which:

FIG. 1 is intended to recall an example of architecture for Evolved Packet System EPS, FIG. 2 is intended to illustrate, in a simplified way, an example of system and handover scenario, wherein embodiments of the present invention can be used, FIG. 3 is intended to illustrate, in a simplified way, information exchanged upon handover, for example in a system as illustrated in FIG. 2, according to embodiments of the present invention.

Market reports and advertisements for terminals reflect the gear towards massive downloads wherever one is and seamlessly coupled with mobility. On the other hand network operators, as they want to progressively manage the delivery of content, want to both offer broad access to popular content and minimize the costs induced in their network operation by those broadband and QoE demanding applications.

A major problem to solve is the QoE guaranty during Handovers (HO) on broadband greedy and highly bursty sessions, which can be initiated massively, arbitrarily and imperatively and therefore need to be well prepared, especially in technologies such as LTE.

Embodiments of the present invention propose a layer cooperative solution to assist the HO of a Mobile Terminal (MT) performing a content downloading session with information on the cost associated to the choice of a given location from which to download the content. This implies the involvement of protocols such as the IETF Application layer Traffic Optimization (ALTO) in the HO procedure. Embodiments of the present invention also imply extensions of the ALTO features to mobile core networks.

Currently the design of handover (HO) protocols remains influenced by the legacy network usage model including a moderate bitrate and sparse occurrences of broadband greedy applications such as video download. The HO decisions are made outside of the EPC, by the eNBs with MME only being noticed on new serving eNB. Besides, the source eNB chooses the target eNB based on signal conditions sensed by the UE with possible additional information from the RRC.

To improve its QoE for a video streaming, the UE may use the IETF ALTO protocol, whose design goal to optimize both the user Quality of Experience (QoE) and usage of network resources by providing to the UE information helping it to choose the best possible location from which to download the whole or piece of video.

It is not the responsibility of the ALTO protocol to care about the UE mobility. However, the mobility of a UE can impact its path to the PDN and thus the path to the content and thus the related QoE. Therefore, it is necessary to inform the UE, which could take the appropriate decisions, concerning the changes occurred in its path. Currently, during mobility there is no association between network level information and application level information when a handover occurs.

As for ALTO: the IETF ALTO working group provides guidance to content delivery applications in networks such as P2P or Content Delivery Networks (CDN), which have to select one or several hosts or endpoints from a set of candidates that are able to provide a desired data resource. This guidance shall be based on parameters that affect performance and efficiency of the data transmission between the hosts, e.g., the topological distance. The ultimate goal is to improve QoE of the application while reducing resource consumption in the underlying network infrastructure. To this end, ALTO Servers deployed by Network Operators (NO), provide requesting ALTO Clients with information, currently such as the NO-centric view on the network topology, the candidate endpoints with attributes such as their routing cost or connectivity type.

In the following, the case of an EPS network and an intra E-UTRAN HO leading to a change of Serving Gateway (SGW) will more particularly considered by way of example. However embodiments of the present invention are not limited to such case, for example in an EPS network embodiments of the present invention could also apply to an intra E-UTRAN HO not leading to a change of SGW, or to an inter-RAT HO from/to E-UTRAN to/from GERAN/UTRAN.

Embodiments of the present invention enable to improve the broadband service continuity by guarantying the service quality when an intra E-UTRAN HO leads to a change of Serving Gateway (SGW).

Suppose that the user equipment (UE) receives content from a source content location called here an Endpoint (EP).

This Source EP (SEP) has been previously selected among a set of candidate EPs from which the desired content is available, by optimizing the cost of streaming and routing to the UE.

The IP path between the SEP and the UE is noted P(SEP, UE) and is a concatenation of the path between the UE and the PDN Gateway (PGW) in the EPC and the path between the PGW and SEP. These 2 paths are respectively noted P(PGW, UE) and P(SEP, PGW).

On the IP route between UE and PGW lies the Serving Gateway (SGW) to which the eNB serving the UE is attached. Suppose that during a HO, a change of eNB causes a change of SGW. The path between the SEP and the UE is thus changed, in its last hop, that is between the PGW and the SGW. This is illustrated in FIG. 2.

Although, after a HO, the list of candidate EPs remains the same, the associated downloading and routing cost may have changed and needs to be updated. A possible consequence is that the EP from which to download is no more optimal and needs to be changed.

It is assumed here that the UE has an ALTO client or is connected to an ALTO client that gets from an ALTO server the path cost to an endpoint at which it accesses content of other resources. Note that any other means used to evaluate the path cost to application endpoints is applicable.

The ALTO server provides the cost of the end to end path between the UE and the candidate endpoint. If the costs on this path changes, and in particular on the EPC hop from the UE to the PGW, the UE needs to be notified of the change in the EPC path in order to re-evaluate the cost of relevant EPs.

Embodiments of the present invention propose to do this via the NAS protocol (specified in particular in 3GPP TS 24.301) in particular with the EPS Mobility Management protocol (EMM).

The MME is aware that the SGW has changed and notifies the UE via the EMM protocol, that a change has occurred on its EPC path and that this change requires an update of the path costs. An option is to trigger this signaling only if the MME is aware that the UE has requested such a notification service.

Embodiments of the invention propose to define a new specific value for the $3^{rd}$ octet of a Notification Indicator sent to the UE via the NAS interface and that would signify the EPC path change and the necessity to update path costs. As only 1 value for this specific octet is specified, it would be necessary to:

allow particular bit/value of Notification Indicators, specified in TS 24.301 [9] to be defined and
Have the user equipment taking it into account.

The HO protocol currently specified at the 3GPP includes the following particular steps 1. User equipment UE sends a measurement report to source eNB, according to the eNB specifications,
2. if decided by the source eNB, the HO procedure is done. The EPC is not involved in the decision process,
3. The target eNB notifies the MME that the UE has changed eNB,
4. The MME requires the SGW to change its data path to the UE accordingly,
5. if the SGW has also changed, the data path update must be notified until the PGW level.
6. the MME then gets a User Plane Update Response from the new SGW.

Note that in the standard E-UTRAN HO protocol, the UE is never informed when a change of SGW occurs.

Embodiments of the present invention introduce an additional message sent by the mobile core network to the user equipment (UE) after step 6, and notifying the UE that a change has occurred in the data path that requires an action from the UE.

The HO impacts the cost associated to the Content Locations from which it downloads/receives content and require the UE to make a Content Location Cost Update (CLCU).

After Step 6, the MME is aware of the change of SGW because it got a PATH SWITCH message from the new SGW via the S11 interface.

(i) The MME upon this information notifies the UE of a path change that requests action. The MME notifies the UE via the 3GPP defined Non Access Stratum EPS Mobility Management protocol (NAS-EMM).

(ii) It uses an information element called Notification Indicator (NI) and specified by the 3GPP in TS 24.301 §8.3.18A.

The notification indicator is a 3 octets long message structured as follows, in §9.9.4.7A.

Octet1: NI IEI
Octet2: length of NI contents
Octet3: NI value

In the current specification No 24.301 (§9), only one bit of this octet is specified to be considered by an UE receiving it: it is bit No 1 signaling "SRVCC HO cancelled, IMS session re-establishment required" see 3GPP TS 23.346 [8].

Any other value between [00000010] and [01111111] is currently non-reserved, non-specified and thus ignored by a UE receiving it.

Embodiments of the present invention propose to:

Use another value and corresponding bit to carry a message from the MME to the UE that signifies: "S5/S8 bearer has changed", This value and associated bits can be, for example bit No 2, that is, the octet 3 encoding would be: 00000010.

As an option, the proposed Notification Indicator may only be sent if the UE needs it.

The UE may express this needs in several ways, including:

Setting and activating an option that allows the UE to recognize such a NAS message, or
Notifying the MME that it is willing and ready to receive such a NI.

The notification of the S5/S8 Bearer change may be preferred to a notification of S1 Bearer change because it covers change of either SGW and PGW and both require a path cost update. A S1 Bearer change notification would only cover a change of the SGW.

It is assumed in the scenario illustrated in FIG. 2, that the UE has an ALTO client or is connected to an ALTO client that gets from an ALTO server the path cost to an endpoint at which it accesses content of other resources.

Note that any other means used to evaluate the path cost to application endpoints is applicable.

The ALTO server provides the cost of the end to end path between the UE and the candidate endpoint. If the cost on this path changes, and in particular on the EPC hop from the UE to the PGW, the UE needs to be notified of the change in the EPC path in order to re-evaluate the cost of relevant EPs.

FIG. 2 represents a scenario with an UE having an embedded ALTO client that queries and gets ALTO information, upon notification of SGW change. In this scenario, it is assumed that UE runs an application that includes using some resource and/or content located at "Endpoints" (EPs) in the Internet. The application offers a choice of several EPs with which to connect, to run the application. Typical examples of such application include P2P and Content Delivery. To select one or more EPs, the UE uses the ALTO client/server protocol, as it is supported by its hosting operator. An ALTO Client is embedded in the UE and linked to the application clients able to use the ALTO protocol.

The ALTO information exchange takes place in the following steps:
1. UE is connected to EP1 via SGW 1 (dotted path). The cost of accessing resources at EP1 is equal to 7.5. This value has been previously provided by the ALTO Server to the ALTO Client that has requested the "ALTO Endpoint Cost Service" for a set of candidate EPs including EP1, whose identifier has been inserted in the ALTO Client request. Upon the received EP cost values, UE has selected EP1.
2. Due to mobility, UE makes a HO to "destination eNB", which is connected to the PGW via another SGW called SGW2.
3. It happens that the cost of the hop between UE and the PGW (still the same) changes from 7.5 to 5. The cost from UE to EP1 changes from 7.5 to 6. UE could be satisfied and continue interacting with EP1.
4. However, UE gets a notification of SGW change. As it is using ALTO and interacting with EPs that are selected with the help of ALTO, UE knows it should update the "ALTO EP Cost" values.
5. Alter HO, the list of candidate EPs remains the same; in this example: EP1 and EP2, unless the application has performed another Endpoint gathering, in which case ALTO is ran systematically. The Application Client in the UE asks its embedded ALTO Client to request the ALTO EP Cost Service for EP1 and EP2.
6. The ALTO Client gets a response from the ALTO Server: Cost(EP1)=6 and Cost(EP2)=5. Thanks to this information, UE may decide to connect to EP2 rather than EP1 and thus get a better QoE.

This new value is due to the change of the cost of the path between UE and PGW. The ALTO Server is aware of this change because it is located in the EPS, and has a view on the EPS that reports several possible cost values on the $1^{st}$ hop cost. This ALTO Server can also get Cost information from the PGW to the EPs because it is "cascaded" with one or more ALTO Servers in the provider core, beyond the PGW. An example ALTO Server cascading is described in section 6 of ALTO draft http://tools.ietf.org/pdf/draft-ietf-alto-deployments-04.pdf.

FIG. 2 thus illustrates an example where a HO from source eNB to destination eNB causes a change from SGW1 to SGW2 and subsequently a change of the associated path cost from the user equipment (UE) to endpoints (EPs) in the packet data network. Suppose that the cost of the end to end path (from UE to EP) is calculated as MAX[P(EP, PGW), P(PGW, UE)], and is to be minimized. In this example, the path cost from UE to PGW evolves from 7.5 to 5. With SGW2, the least cost EP becomes EP2 with C=5, where as the cost with EP1 equals 6, so EP2 is preferable.

Note that cost of type $C=MAX\_i(Ci)$ are frequent when the worst value must be taken over the Ci, for instance to evaluate the cost in terms of bandwidth availability.

FIG. 3 is intended to illustrate, in a simplified way, information exchanged upon handover, for example in a system as illustrated in FIG. 2, according to embodiments of the present invention.

Following steps are illustrated in FIG. 3:
in a step noted 1, UE receives from a mobile network entity information indicating a change of traffic path in said mobile network due to said handover,
in a step noted 2, UE provides said information to an application layer-level entity associated with said UE; in following steps it is considered by way of example that this application layer-level entity is an ALTO Client,
in a step noted 3, the ALTO Client sends a request for updated costs to an ALTO Server,
in a step noted 4, the ALTO Server provides updated costs to the ALTO Client, given the change in the EPS path cost and possible changes in the EP costs beyond the PGW.
connection endpoint re-selection (not specifically illustrated) can then be performed based on said updated costs.

QoE sensitive and bandwidth demanding applications on mobiles are exploding. There is no standard way for network layer to cooperate with the application layer. Embodiments of the present invention provide a light way for a UE to improve its application QoE upon changes of its network paths.

In one aspect, there is provided a method for handover enhancement for User Equipment UE application layer traffic carried over a mobile network.

In an embodiment, said method comprises at least one step based on informing said UE of a traffic path change in said mobile network due to said handover, requiring action at application layer level.

In an embodiment, said method comprises a step of:
said UE providing said information to an application layer-level entity associated with said UE.

In an embodiment, said method comprises a step of:
an application layer-level entity associated with said UE, such as ALTO Client, using said information for application layer traffic optimization.

In an embodiment, said method comprises a step of, for UE application layer traffic carried over said mobile network between said UE and a connection endpoint in an external network, for an application allowing a choice of connection endpoint and using application layer traffic optimization services for selection of a connection endpoint:
an application layer-level entity associated with said UE using said information for re-selection of a connection endpoint, using said application layer traffic optimization services, due to said handover.

In an embodiment, said method comprises a step of:

a mobile network entity involved in said handover, such as Mobility Management Entity MME in Evolved Packet System EPS network, signaling said information to said UE.

In an embodiment, said method comprises a step of:
a mobile network entity involved in said handover, such as Mobility Management Entity MME in Evolved Packet System EPS network, signaling said information to said UE via signalling protocol, such as Non Access Stratum NAS signalling protocol.

In an embodiment, said handover includes intra E-UTRAN handover, in an Evolved Packet System EPS network.

Other aspects relate to different entities for performing step(s) of such method. Such entities may include, in particular, User Equipment UE, application layer-level entity associated with said UE and which may be included in said UE, such as ALTO Client, and mobile network entity such as entity involved in handover, such as Mobility Management Entity MME in EPS network.

There is provided a mobile network entity such as entity involved in handover, such as Mobility Management Entity MME in Evolved Packet System EPS network.

In an embodiment, said mobile network entity is configured to:
inform an User Equipment UE having application layer traffic carried over said mobile network, of a traffic path change in said mobile network due to a handover in said mobile network, requiring action at application layer level.

In an embodiment, said mobile network entity is configured to:
signal said information to said UE via signalling protocol, such as Non Access Stratum NAS signalling protocol.

There is provided an User Equipment UE, having application layer traffic carried over a mobile network.

In an embodiment, said UE is configured to:
receive information informing said UE of a traffic path change in said mobile network due to a handover in said mobile network, requiring action at application layer level.

In an embodiment, said UE is configured to:
receive said information from a mobile network entity involved in said handover, such as Mobility Management Entity MME in Evolved Packet System EPS network, via signalling protocol, such as Non Access Stratum NAS signalling protocol.

In an embodiment, said UE is configured to:
provide said information to an application layer-level entity associated with said UE.

There is provided an application layer-level entity, such as ALTO Client, associated with an User Equipment UE having application layer traffic carried over a mobile network.

In an embodiment, said application layer-level entity is configured to:
receive from said UE, information informing said UE of a traffic path change in said mobile network due to a handover in said mobile network, requiring action at application layer level.

In an embodiment, said application layer-level entity is configured to:
use said information, for application layer traffic optimization.

In an embodiment, said application layer-level entity is configured to, for UE application layer traffic carried over said mobile network between said UE and a connection endpoint in an external network, for an application allowing a choice of connection endpoints and using application layer traffic optimization services for selection of one or more connection endpoints:
use said information for re-selection of a connection endpoint, using said application layer traffic optimization services, due to said handover.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for handover enhancement for User Equipment UE application layer traffic carried over a mobile network, said method comprising, for UE application layer traffic carried over said mobile network between said UE and a connection endpoint in an external network, for an application allowing a choice of connection endpoint and using application layer traffic optimization services for selection of a connection endpoint:
a mobile network entity involved in said handover informing said UE of a traffic path change in said mobile network due to said handover, requiring action at application layer level;
said UE providing said information to an application layer-level entity associated with said UE;
an application layer-level entity associated with said UE using said information for re-selection of a connection endpoint, using said application layer traffic optimization services, due to said handover.

2. A method according to claim 1, comprising:
a mobile network entity involved in said handover, such as Mobility Management Entity MME in Evolved Packet System EPS network, signaling said information to said UE via signalling protocol, such as Non Access Stratum NAS signalling protocol.

3. A method according to claim 1, wherein said handover includes intra E-UTRAN handover, in an Evolved Packet System EPS network.

4. A mobile network entity involved in handover in Evolved Packet System EPS network, comprising at least one processor programmed to:
inform an User Equipment UE having application layer traffic carried over said mobile network, of a traffic path change in said mobile network due to a handover in said mobile network, requiring action at application layer level;
for UE application layer traffic carried over said mobile network between said UE and a connection endpoint in an external network, allowing a choice of connection endpoint and using application layer traffic optimization services for selection of a connection endpoint.

5. A mobile network entity according to claim 4, configured to:
signal said information to said UE via signalling protocol, such as Non Access Stratum NAS signalling protocol.

6. A User Equipment UE, having application layer traffic carried over a mobile network, said UE comprising at least one processor programmed to:
   receive information informing said UE of a traffic path change in said mobile network due to a handover in said mobile network, requiring action at application layer level;
   for UE application layer traffic carried over said mobile network between said UE and a connection endpoint in an external network, allowing a choice of connection endpoint and using application layer traffic optimization services for selection of a connection endpoint.

7. A User Equipment according to claim 6, configured to:
   receive said information from a mobile network entity involved in said handover, such as Mobility Management Entity MME in Evolved Packet System EPS network, via signalling protocol, such as Non Access Stratum NAS signalling protocol.

8. A User Equipment UE according to claim 6, configured to:
   provide said information to an application layer-level entity associated with said UE.

9. An application layer-level entity associated with an User Equipment UE having application layer traffic carried over a mobile network, said entity comprising at least one processor programmed to, for UE application layer traffic carried over said mobile network between said UE and a connection endpoint in an external network, for an application allowing a choice of connection endpoints and using application layer traffic optimization services for selection of one or more connection endpoints:
   receive from said UE, information informing said UE of a traffic path change in said mobile network due to a handover in said mobile network, requiring action at application layer level;
   use said information for re-selection of a connection endpoint, using said application layer traffic optimization services, due to said handover.

10. A method according to claim 1, wherein the mobile network entity is a Mobility Management Entity.

11. A mobile network entity according to claim 4, wherein the mobile network entity is a Mobility Management Entity.

12. An application layer-level entity according to claim 9, wherein the application layer-level entity is an ALTO Client.

* * * * *